June 4, 1940.   N. C. BRUNDAGE   2,203,592
GAS SCRUBBER
Filed March 21, 1938   3 Sheets-Sheet 3

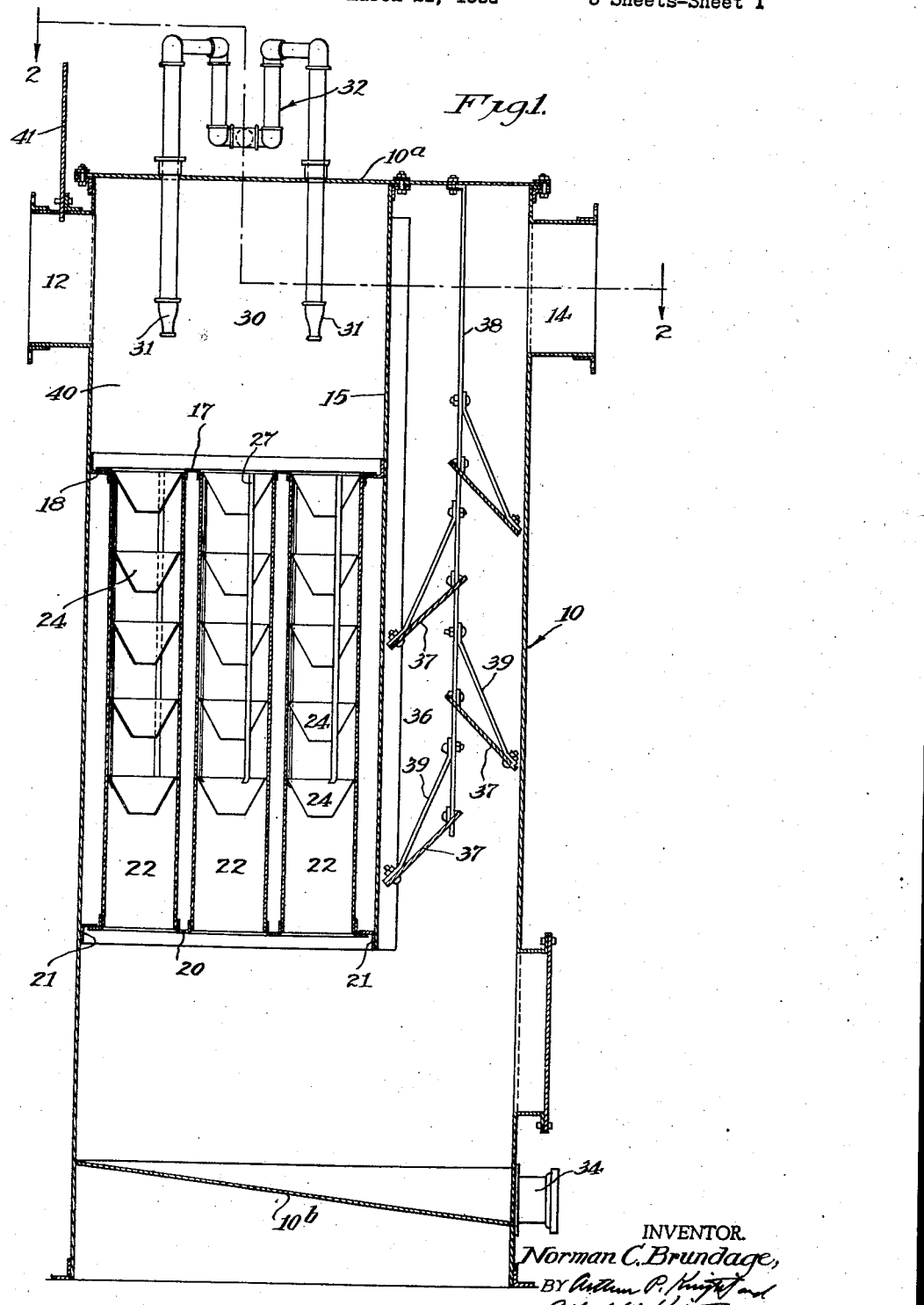

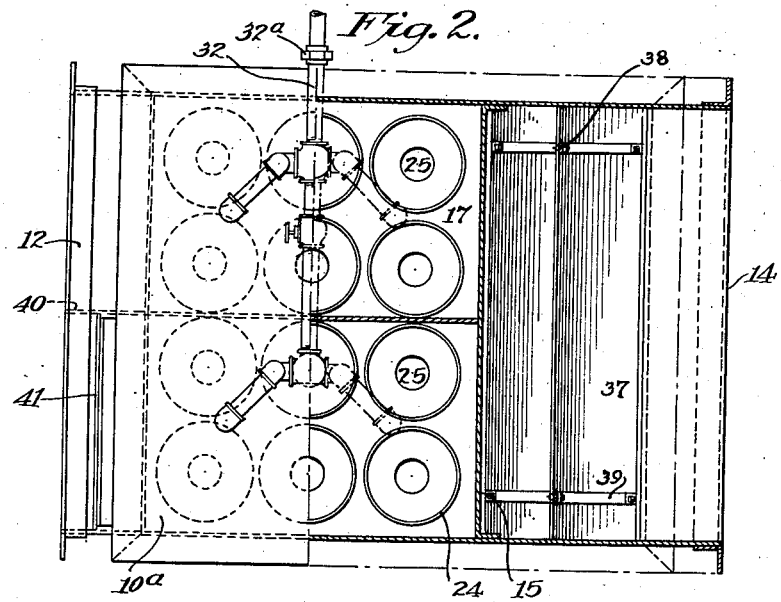
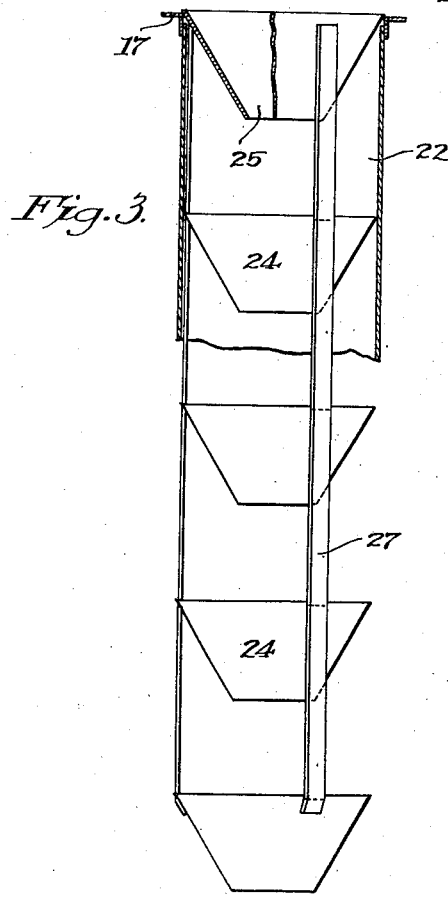
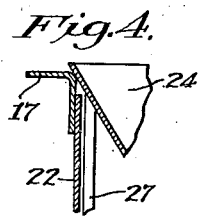
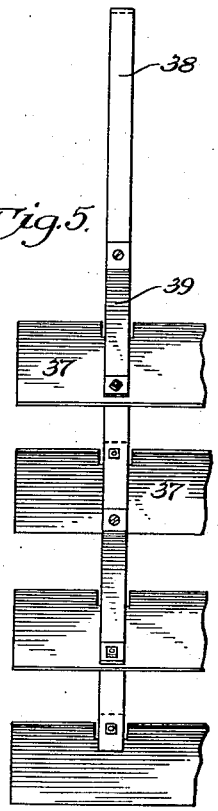

INVENTOR.
Norman C. Brundage,
BY Arthur P. Knight and
Alfred W. Knight
ATTORNEYS.

Patented June 4, 1940

2,203,592

UNITED STATES PATENT OFFICE 2,203,592

GAS SCRUBBER

Norman C. Brundage, Los Angeles, Calif., assignor to Western Precipitation Corporation, Los Angeles, Calif., a corporation of California Application March 21, 1938, Serial No. 197,285

8 Claims. (Cl. 261—112)

The present invention relates generally to gas washing or scrubbing devices in which suspended particles of finely divided foreign matter are removed from a gas stream, liquid being passed through the device to help collect solid foreign particles and prevent their redispersion into the gas stream. The foreign particles are usually solid matter and so I describe the gas washer as operating to remove dust of that character; but it will also be understood that the same construction may be used to remove suspended particles of liquid from a gas stream.

It is a general object of my invention to provide a scrubber of this general type having a high collection efficiency that is undiminished over a wide range of gas volume. High efficiency is desired not only in order to accomplish a given task well by removing a high percentage of foreign matter, but also because a device of a given size and cost handles gas volumes requiring much larger devices that are less efficient.

Another object of the present invention is to provide a gas washer that subjects the gas stream to a minimum of draft loss as it passes through the device. Draft losses represent power losses, and the cost of operation is determined to a large extent by the energy required to force the gas stream through the washer at an effective velocity. Hence a device having a minimum pressure drop between the gas inlet and the outlet costs the least to operate for a given set of conditions.

It is also an object to provide a gas washer that is unlikely to stop up completely from accumulated deposits and that is easy to clean of any deposits. A scrubber that is sufficiently self-cleaning to prevent large accumulation of solid matter, maintains its high collection efficiency at all times and is adapted to the continuous service now demanded of such equipment. Some types of solid particles are very much more difficult than others to fully remove from the washer, and in the event that dusts of this character accumulate, it is an object of the invention to make possible quick, effective cleaning by externally operated means without interrupting operation of the scrubber.

These objects are attained in a scrubber constructed according to my invention by providing within a housing a plurality of members defining constricted openings through which the gas passes in succession. Arranged in series, these openings are alined with one another in the direction of gas flow so that, considered alone, they form, in effect, a straight uninterrupted passage for the gas; though actually the gas stream is constricted just prior to passing through each individual opening and expands just after passing through the opening. The opening-defining members preferably comprise downwardly converging wall means which converge toward the constricted openings. Wash liquid, normally water, is introduced, as by spraying or otherwise at the upper end of the housing, and the liquid, passing down over the members in series, wets their surfaces. As the liquid runs off the lower edge of one member, the gas stream picks up droplets of the liquid, carrying them against and wetting various surfaces of the opening-defining members and the housing, and the contact of the gas with these wetted surfaces separates the suspended particles which, being held in the liquid stream, are not redispersed into the gas stream. When a mist of liquid particles is separated from the gas stream, the wash liquid may be omitted. A series of truncated conical members is preferably used to provide a series of circular openings in the housing. I also show flat members arranged to form a series of slots as exemplifying possible variations in construction and shape of the parts. Gas flow through the housing is preferably downwardly, concurrently with the liquid, to wash the gas; and then the cleaned gas flows through another portion of the housing, preferably upwardly, having means to remove droplets of the wash liquid carried by the gas.

How the above objects and advantages of my invention, as well as others not above specifically mentioned, are attained, will be more readily apparent from the following description and the annexed drawings, in which:

Fig. 1 is a vertical section through a preferred form of gas washing device constructed in accord with my invention;

Fig. 2 is a combined plane and section taken on line 2—2 of Fig. 1;

Fig. 3 is an enlarged fragmentary elevation showing the arrangement and construction of one series of conical opening-defining members used in Fig. 1;

Fig. 4 is an enlarged fragmentary detail of the upper left hand corner of Fig. 3;

Fig. 5 is a fragmentary elevation of one end of the outlet baffle for removing wash liquid;

Figure 7:
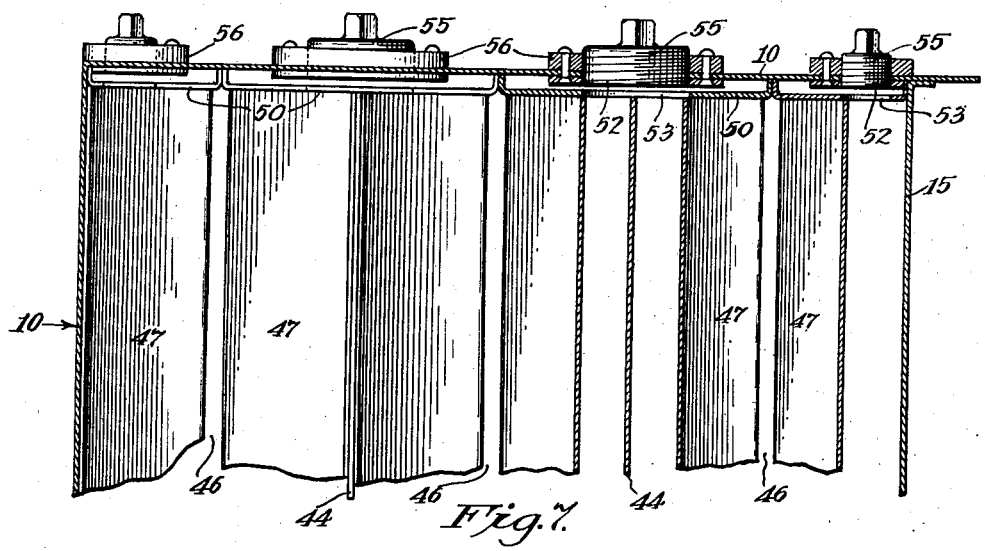
Fig. 7 is an enlarged fragmentary section taken on line 7—7 of Fig. 6.

Referring now to Fig. 1, my improved gas cleaning device comprises a housing generally indicated as 10 through which the gas flows to be cleaned. At the top of the housing, and on opposite sides thereof, are located gas inlet 12 and gas outlet 14. As may be seen by also referring to Fig. 2, inlet 12 and outlet 14 are rectangular in outline and extend horizontally across the entire width of housing 10. Interposed between the inlet and outlet is vertical partition 15 which extends from the top 10a of housing 10 downwardly to a point near the bottom of the housing which is divided by the partition into two main portions. Gas entering the housing through inlet 12 flows downwardly on the left-hand side of partition 15, around the bottom of the partition, and thence upwardly within the housing to outlet 14.

Upper header plate 17 is supported by angles 18, or other suitable means, on the walls of housing 10 a short distance below inlet 12. Header plate 17 extends horizontally across the entire space between the three side walls of the housing and partition 15 at the inlet side of the partition. Lower header plate 20 is located directly below the upper header plate and is similarly supported from the housing walls by angles 21. Each of header plates 17 and 20 has a number of flanged circular openings, and corresponding openings in the upper and lower plates are connected by cylindrical tubes 22. Each of these cylindrical tubes subdivides the entire housing into which gas flows, and the number of these ducts within the housing is determined entirely by the volume of gas which it is desired to pass through the housing for cleaning. In the washer illustrated, twelve of these cylindrical tubes are shown, but it will be realized that a greater or lesser number may be used according as a larger or smaller gas capacity is required.

Each tube 22 has within it a series of frustoconical members 24 which, for convenience of reference, may hereinafter be referred to as cones. As may be seen in greater detail from Fig. 3, each conical member 24 is a hollow figure formed from sheet metal and open at both ends. Any desired number of these cones, preferably four or five, is arranged in a series within a tubular duct 22, the lower ends of the cones forming a vertically alined series of circular openings 25 through which the gas flows in succession. Openings 25 are of smaller area than the cross-sectional area of the tube 22.

The series of cones 24 in any one tube 22 may conveniently be held spaced at substantially equal vertical intervals by attaching them all to vertically extending bars 27 of which there are three at equal intervals around the peripheries of the cones. Gas openings 25 of the top cones 24 are maintained in a horizontal plane parallel to and spaced from the plane of plate 17; and the openings of each lower set of cones lie in a similar horizontal plane, there thus being a series of such vertically spaced planes in which the gas openings are placed. The top cone of the series has a greater slant height than the other cones, and its maximum diameter is greater than the diameter of tube 22. The large upper end of the top cone engages the periphery of the flanged opening in header plane 17 and the cone rests upon plate 17 as shown in Fig. 4. The lower cones of the series have their maximum outside diameter substantially equal to the internal diameter of tube 22, a small clearance being allowed between the cones and the tube wall in order that the cones will slide easily into place. Vertical bars 27 are attached at their upper end to the top cone of the series, and the lower cones are suspended from the top cone by bars 27, the lower cones being notched at their upper edges to receive bars 27, as shown in Fig. 3, without creating a gap between the cones and the tube wall. This construction permits removal as a single unit of the entire series of cones in a tube, as is desirable when cleaning, or replacing the cones with others of different size or shape. This unit construction also makes for convenience and cheapness in manufacturing and assembly.

In spray chamber 30 above header plate 17, there is located any suitable means for supplying wash liquid to the upper ends of members 24 and wetting the surfaces of these members, particularly in the vicinity of openings 25. Although any suitable means for distributing the liquid evenly to all ducts 22 may be used, the plurality of spray heads or nozzles 31 located in spray chamber 30 is typical of such means and is used because the spray of liquid maintained gives even distribution. Liquid is supplied to nozzles 31 by a piping system indicated generally at 32 which is connected to any suitable source of liquid supply. The liquid is normally water, but any other liquid or solution may also be used within the scope of my invention.

The liquid from nozzles 31 runs downwardly through members 24 and tubes 22 and is collected in the bottom 10b of housing 10, which preferably slopes toward one side to facilitate collection of the liquid in a sump at the lowest portion of the housing. A drain 34 connects with the sump and conducts the liquid either to waste pipes or to a settling basin where the collected solid material is settled out and the liquid pumped back into piping system 32 for recirculation through the gas washer.

In the space 36 on the outlet side of partition 15, the clean gas ascends to reach outlet 14, carrying with it in suspension more or less liquid picked up as it passed through tubes 22. The suspended droplets of liquid are removed by inclined baffles 37 which are suspended in space 36 by a pair of strap hangers 38 attached at their upper ends to top wall 10a of housing 10. The arrangement of baffles 37, which are flat plates and the manner of their connection to straps 38 by braces 39 are shown in Figs. 1 and 5.

In operation, the gas enters through inlet 12, and passes downwardly through the housing, the main gas stream being divided into a number of smaller ones each of which flows through a duct 22. Considering now one of these smaller streams, as it passes downwardly through each conical member 24, the gas stream is compressed or constricted by the downwardly converging walls of the conical member. Immediately after passing through an opening 25, the gas stream is released and expands outwardly toward the wall of tube 22, the expansion setting up eddy currents around the lower end of cone 24. This condition is repeated as the gas stream passes through each of the opening-defining members 24 in succession.

The liquid spray from nozzles 31 is distributed evenly over the entire bottom of the spray chamber and keeps the upper surface of each top cone 24 continually wet. The liquid is supplied in sufficient quantity to form a film that runs down the conical surface and through opening 25 to reach the upper conical surface of the cone next below it. If there were no disturbance from the gas stream, the flowing liquid would drip off the cone in the form of a circular curtain. But because of the high velocity of the gas stream as it leaves an opening 25, the liquid is picked up at the periphery of opening 25 by the gas stream, carried outwardly by the stream, and spread by the eddy current over the conical surface of the member 24 next below where a similar liquid film is formed. A certain amount of the liquid in small droplets picked up by the gas stream as it leaves each opening 25 is carried in suspension against the under surfaces of cone 24 and the walls of tube 22. Consequently, in practice the upper and lower surfaces of all cones 24 as well as the inner surface of tube 22 are kept wetted at all times with the liquid. The alternate constriction and expansion of the gas stream causes all parts of the stream to repeatedly come in contact with the wetted surfaces within duct 22; and it is primarily by this contact with wet surfaces that the suspended particles of solid or liquid matter carried by the gas stream are separated from the gas and collected in the film of liquid on these surfaces. In the case of solid particles, the liquid film holds them against redispersion into the gas stream. The gas stream passes through a spray of liquid not only in spray chamber 30, but every time that the gas stream expands after passing through an opening 25. This action not only helps mechanically to wash suspended particles out of the gas stream but also serves to distribute the wash liquid over the various surfaces against which the gas impinges.

Alined openings 25, being each of considerably less area than the cross-sectional area of duct 22, have the effect of confining the gas stream to a relatively smaller area located centrally of the duct. In this center area there is no obstruction to gas flow, and if the gas were to flow in a straight line, it could pass entirely through a duct without being diverted. An important result secured by the alined openings is the very low pressure drop between the top and bottom of a duct 22. However, the abrupt enlargement of the space available for gas flow in the duct section immediately below each opening 25 and following a section in which fall means in the duct gradually constricts the gas flow to a small area, creates a turbulent flow condition and brings the gas stream intimately into contact with wetted surfaces within duct 22.

Actual experiments have indicated that under most ordinary conditions, a maximum efficiency of dust collection is reached with about four or five cones in a series. A lesser number normally decreases the amount of dust removed, while a larger number of cones increases the pressure drop between the upper and lower ends of duct 22 without effecting any material increase in collection efficiency. Although the partition means represented by tube walls 22 may under some circumstances be omitted, as in construction later mentioned, yet it is preferred that partition means be used to subdivide the housing interior into a plurality of separate ducts operating in parallel, each taking a portion of the entire gas stream. The value for such partition means is evident when using circular members 24 because they do not fit together tightly at their top edges. The partition means is preferred because it reduces over all pressure drop, confines the gas to passage through cones 24, and eliminates any flat horizontal surfaces on which dust can accumulate.

The largest portion of the liquid with the collected solid matter drops down from the end of ducts 22 into the sump of the housing bottom 10b, and the larger droplets in suspension are separated out from the gas stream by gravity because of the reverse flow taking place as the gas stream moves upwardly through passage 36. This gravitational separation of the larger suspended droplets is facilitated by making the cross-sectional area of passage 36 sufficiently large that the mean gas velocity through it is somewhat lower than the mean gas velocity through ducts 22. The smaller particles of liquid still carried in suspension are removed by impingement of the gas stream against the plurality of inclined baffles 37 which are placed in staggered positions and overlapped vertically, forcing the gas to follow a devious, winding path before it reaches outlet 14. Better drainage and removal of wash liquid is obviously obtained when ducts 22 are vertical, but otherwise the device may be satisfactorily operated with ducts 22 horizontal.

Because the series of alined openings 25 always offers a straight path through the series of elements 24, even though a deposit of dust accumulates on the surface of cones 24 and tube 22, it is almost impossible under ordinary operating conditions to clog up the washer to such an extent that gas can not pass through. But some deposits will accumulate and when cleaning is desired, it is a simple matter to remove the top plate 10a, which is preferably bolted to the side walls to make removal easy, thus gaining access to the upper ends of the several gas ducts. For a thorough cleaning, the entire series of cones in any duct is removed as a unit, and all surfaces are then entirely exposed for easy cleaning. It may be also found convenient to provide a series of openings in the top of the housing located directly above the several ducts 22 so that a cleaning tool operated externally of the housing may be inserted through these openings in the housing and passed vertically through gas openings 25. Removal of the housing cover is facilitated by mounting directly on the housing cover the several branches of pipe line 32 leading to nozzles 31. Then by disconnecting the supply pipe at union 32a, all the branches and nozzles 31 can be removed with the cover plate with a minimum of time and effort.

An optional construction that affords flexibility in operation includes a vertical partition 40 that divides inlet 12 and spray chamber 30 into two parts of equal size, and adjustable damper 41 in inlet 12 adapted to close off one half of the inlet when lowered. When damper 41 is raised, as shown in Fig. 1, the entire gas washer operates at full capacity but in the event that the volume of gas supplied drops materially, it is often far more efficient to operate only a portion of the washer since in this way the gas velocity and pressure drop may be maintained at the most efficient values for dust collection. The division of the washer into two parts by partition 40 is simply typical of many variations which might be used. For example, the single partition 40 may be so placed that only a quarter or a third of the ducts 22 are taken out of operation by lowering damper 41; or a plurality of partitions 40 may be used along with a plurality of individual dampers 41, all arranged and controlled to make possible the operation of one or more selected groups of ducts 22. The same type of operation may be obtained on a larger scale by placing two complete gas cleaners in parallel with inlets 12 attached to branches of a gas conduit, not shown, each of the branches having suitable damper means such as damper 41 located in it.

It is also possible that the gas at the time of entry through inlet 12 may carry in suspension sufficient liquid in small droplets, either with or without solid particles also in suspension, to render unnecessary any wash liquid. This occurs typically when removing mist from a gas stream. In this case, spray nozzles 31 are not used, or may be omitted entirely from chamber 30. The suspended liquid is deposited on the surfaces of cones 24 and tubes 22 which are wetted in the same manner as when a spray of wash liquid is introduced. Baffles 37 are preferably retained to remove any liquid particles still carried by the gas as it rises in space 36.

Figure 6:
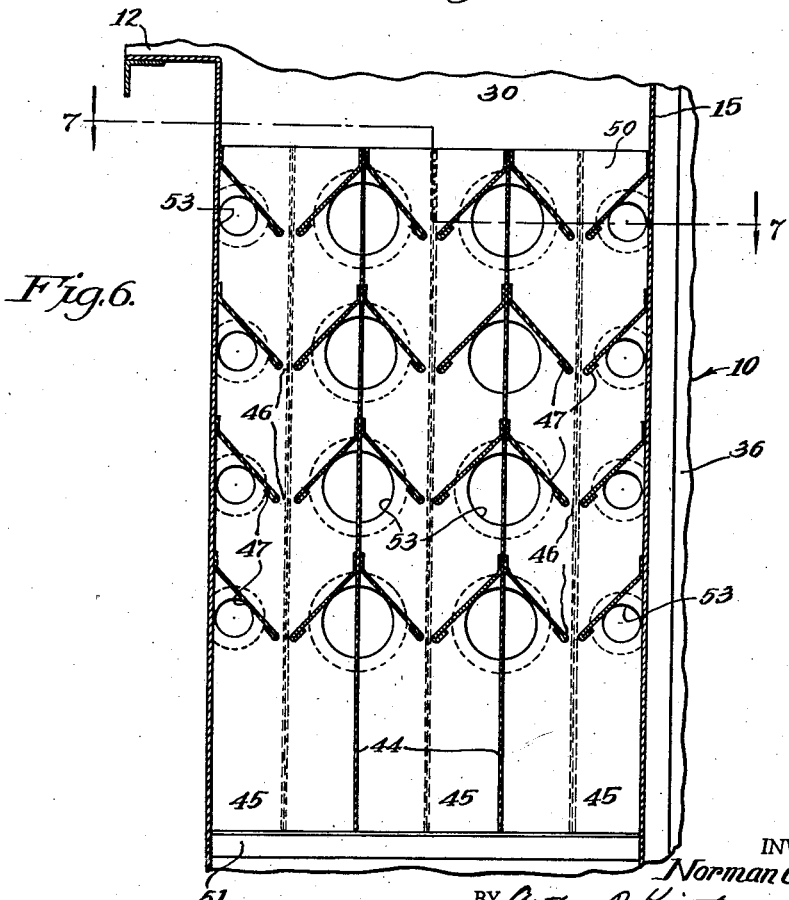
Fig. 6 is a vertical section through a variational form of opening-defining members.

A variational form of gas cleaner is illustrated in Figs. 6 and 7. In this latter construction, partition means 44 placed parallel to partition 15 divide the space through which the gas flows downwardly into three ducts 45 of rectangular cross-section which are comparable to the circular ducts 22 of the form already described. The gas openings 46 are now elongated rectangular openings defined by the lower edges of pairs of baffles 47. As shown clearly in Fig. 6, flat plate-like baffles 47 are inclined and a pair of them form downwardly converging wall means which are separated at their lower edges to form or define an opening 46 through which the gas passes. Baffles in a series are substantially equally spaced vertically above one another and form a vertically alined series of spaced openings 46 within and of less area than each of ducts 45.

Baffles 47 and partitions 44 are welded at their ends to vertically extending plates 50 which have flanges along their vertical edges, as shown in Fig. 7, in order to maintain plates 50, and consequently the attached baffles and partitions, properly spaced horizontally of the washer housing 10. Each pair of plates 50, there being one at each side of the housing, together with the attached members 44 and 47 extending between that pair of plates, can be slipped vertically into position as a unit, and the unit rests upon angle 51 or other stop means attached to the side wall of housing 10.

This type of construction lends itself easily to cleaning from a position at one side of the washer, and for this reason it is preferred, although not necessary, to provide a plurality of clean-cut holes 52 in at least one side wall of housing 10, at and just below the ends of baffles 47. Corresponding openings 53 are made in plates 50 to register with each opening 52. As may be seen from Fig. 6, these clean-cut openings are located just below baffles 47 and permit an externally operated cleaning tool to be moved longitudinally of the baffle in contact with the under side thereof to remove any accumulated deposits. Through the same hole, of course, the upper surfaces of the baffles next below are also accessible for cleaning. In this way cleaning is much simplified and it is not necessary to take the washer out of operation or to remove any of the baffles or partitions from the washer in order to effect a thorough cleaning of them. Clean-cut openings 52 are closed by any suitable means, being here shown as closed by threaded plugs 55 screwed into flanges 56 riveted to the side wall of housing 10.

Except for the structure just described, the construction and arrangement of the last form of gas washer is the same as previously described in connection with Figs. 1 to 5. From a comparison of Figs. 1 and 6, it will be seen that by removing header plates 17 and 20 with tubes 22 in the gas washer of Fig. 1, partitions 44 and baffles 47 can be substituted for the removed parts.

As the gas stream passes vertically downwardly through a series of alined gas openings 46 defined by the downwardly converging wall means, solid particles in suspension are removed in the same general manner previously described. Spray heads 31 introduce wash liquid at the upper end of the ducts and so maintain a liquid film which runs down the upper surfaces of the top baffles 47 and is distributed by the gas stream over the surfaces of the lower baffles 47 to maintain wetted surfaces with which the gas stream comes in contact to deposit the suspended solid particles which are held collected by the film of liquid over the operating-defining members 47. In practice, experience has shown that four or five openings 46 in a series produces an optimum balance between maximum cleaning efficiency and minimum pressure drop on the gases as they pass through the ducts 45. However, a different number of openings 46 in each series may be used, as might be determined best for the foreign matter carried in suspension by the gas stream; and likewise a larger or smaller number of ducts 45 may be used within a single housing 10 as required to give the desired gas capacity.

In this variational form of the invention, partition means 44 may be more easily omitted because the upper ends of baffles 47 can be placed tightly against one another and the vertical walls of housing 10 or partition 15 so that all the gas entering through inlet 12 is forced through openings 46. Omission of partitions 44 makes the entire space within the washer to the left of partition 15 a single gas duct. However, it is preferred to use partitions 44 because experiments have indicated that the gas cleaning efficiency of the washer is increased by their presence.

Having described a present preferred form of my invention and certain modifications thereof, it will be understood that various arrangements and constructions of parts may be used without departing from the spirit of my invention; and consequently I wish it understood that the foregoing disclosure is to be construed as illustrative of, rather than limitative upon, the appended claims.

I claim:

1. In a gas scrubber for removing suspended particles from a stream of gas, the combination of a housing through which the gas stream flows; partition means within the housing subdividing the interior into a plurality of rectangular gas ducts; a series of spaced plane, inclined members in each duct defining a series of rectangular openings, each opening having an area smaller than the cross-sectional area of the duct and the series of openings being alined in the direction of gas flow; and means for wetting the surfaces of the members.

2. In a gas scrubber for removing suspended particles from a stream of gas, the combination of a housing through which the gas stream flows; partition means within the housing subdividing the interior into a plurality of vertically extending gas ducts; a plurality of removable vertically extending supports disposed longitudinally of each gas duct; and a plurality of spaced members in each duct attached to the supports in that duct and defining a series of openings alined in the direction of gas flow, each opening having an area smaller than the cross-sectional area of the duct, said supports and attached series of members in a duct being withdrawable as a unit longitudinally of the duct.

3. In a gas scrubber for removing suspended particles from a stream of gas, the combination of a housing through which the gas stream flows; partition means within the housing subdividing the interior into a plurality of vertically extending circular gas ducts; a plurality of removable vertically extending supports disposed longitudinally of each gas duct; a series of spaced frusto-conical members in each duct attached to the supports in that duct and defining a series of circular openings alined in the direction of gas flow, each opening having an area smaller than the cross-sectional area of the duct, said supports and attached series of frusto-conical members in a duct being withdrawable as a unit longitudinally of the duct; and means for wetting the surfaces of the members.

4. In a gas scrubber for removing suspended particles from a stream of gas, the combination of a housing through which the gas stream flows; partition means within the housing subdividing the interior into a plurality of vertically extending gas ducts, each duct being of substantially uniform size and shape throughout its length; a plurality of vertically spaced members in each duct providing a series of centrally converging walls that at intervals gradually constrict the duct and confine the gas in the duct to a single stream occupying a relatively small central portion of the duct, the sections of each duct between successive ones of said members allowing abrupt expansion of the gas stream radially outward to the duct walls, the constricted sections being aligned centrally of the duct to provide a single unobstructed central gas passage; and means supplying wash liquid in finely divided form to the upper end of each gas duct.

5. In a gas scrubber for removing suspended particles from a stream of gas, the combination of a housing through which the gas stream flows; partition means within the housing subdividing the interior into a plurality of vertically extending circular gas ducts, each gas duct being of substantially uniform diameter throughout its length; an inlet chamber introducing gas to the upper ends of all ducts; a plurality of frusto-conical members in each duct, each said member comprising downwardly converging imperforate wall means terminating substantially at the point of greatest convergence to form a gas opening, all said gas openings in each duct being aligned coaxially of the duct to form a single unobstructed gas passage through the duct; an outlet chamber receiving gas from the lower ends of all ducts; and liquid supply means in the inlet chamber introducing wash liquid in finely divided form to the upper ends of the ducts.

6. In a gas scrubber for removing suspended particles from a stream of gas, the combination of a housing through which the gas stream flows; partition means within the housing subdividing the interior into a plurality of vertically extending gas ducts; a plurality of sets of removable vertically extending supports disposed longitudinally of the gas ducts; and a plurality of vertically spaced members in each duct defining a series of openings aligned in the direction of gas flow, each opening having an area smaller than the cross-sectional area of the duct; each set of the supports having attached thereto a plurality of the vertically spaced members and forming therewith a unit withdrawable as a whole from the housing.

7. In a gas scrubber for removing suspended particles from a stream of gas, the combination of a housing through which the gas stream flows; partition means within the housing subdividing the interior into a plurality of vertically extending rectangular gas ducts; a plurality of sets of removable vertically extending supports disposed longitudinally of the gas ducts; and a plurality of vertically spaced plane, inclined members in each duct defining a series of rectangular openings aligned in the direction of gas flow, each opening having an area smaller than the cross-sectional area of the duct; each set of the supports having attached thereto a plurality of the vertically spaced members and forming therewith a unit withdrawable as a whole from the housing.

8. In a gas scrubber for removing suspended particles from a stream of gas, the combination of a housing through which the gas stream flows; a plurality of flat members within the housing, each member presenting to the gas stream a surface lying substantially in a single plane, the members being arranged in spaced pairs with said surfaces of each pair converging in the direction of gas flow to free edges spaced from each other transversely to the gas flow to form a relatively narrow, elongated, unobstructed opening through which gas flows, a series of said openings being aligned in the direction of gas flow with the space between successive gas openings free from obstruction so as to form an unobstructed gas passage through the housing; and means for wetting the surfaces of the members.

NORMAN C. BRUNDAGE.

CERTIFICATE OF CORRECTION.

Patent No. 2,203,592. June 4, 1940.

NORMAN C. BRUNDAGE.

It is hereby certified that error appears in the printed specification of the above numbered patent requiring correction as follows: Page 1, second column, line 39, for the word "plane" read --plan--; page 3, first column, line 45, for "fall" read --wall--; and that the said Letters Patent should be read with this correction therein that the same may conform to the record of the case in the Patent Office.

Signed and sealed this 6th day of August, A. D. 1940.

Henry Van Arsdale,
Acting Commissioner of Patents.

(Seal)